United States Patent
Maccone et al.

(10) Patent No.: US 7,141,140 B2
(45) Date of Patent: *Nov. 28, 2006

(54) AQUEOUS COMPOSITIONS OF PERFLUOROPOLYETHER PHOSPHATES AND USE THEREOF TO CONFER OLEO-REPELLENCE TO PAPER

(75) Inventors: Patrizia Maccone, Milan (IT); Fiorenza D'Aprile, Milan (IT); Mario Visca, Alessandria (IT)

(73) Assignee: Solvay Solexis, S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/340,730

(22) Filed: Jan. 13, 2003

(65) Prior Publication Data

US 2003/0134972 A1    Jul. 17, 2003

(30) Foreign Application Priority Data

Jan. 15, 2002    (IT)    .................. MI2002A0057

(51) Int. Cl.
*D21H 19/12*    (2006.01)
*D21H 17/10*    (2006.01)

(52) U.S. Cl. ............ 162/135; 162/158; 162/184; 106/287.29; 427/395; 427/393.4

(58) Field of Classification Search ........ 162/135–137, 162/158, 164.1, 168.1, 183, 184, 204; 427/391, 427/389.9, 395, 393.4, 388.4, 398.2; 106/287.28, 106/287.29

See application file for complete search history.

(56) References Cited

U.S. PATENT DOCUMENTS

| | | | |
|---|---|---|---|
| 3,242,218 A | 3/1966 | Miller | |
| 3,492,374 A | 1/1970 | Le Bleu et al. | |
| 3,810,874 A | 5/1974 | Mitsch et al. | |
| 4,523,039 A | 6/1985 | Lagow et al. | |
| 4,647,413 A | 3/1987 | Savu | |
| 5,149,842 A | 9/1992 | Sianesi et al. | |
| 5,258,110 A | 11/1993 | Sianesi et al. | |
| 5,271,806 A | 12/1993 | Deutsch et al. | |
| 5,874,169 A | 2/1999 | Falcone | |
| 6,197,903 B1 | 3/2001 | Maccone et al. | |
| 6,221,434 B1 | 4/2001 | Visca et al. | |

FOREIGN PATENT DOCUMENTS

| | | |
|---|---|---|
| DE | 24 05 042 A | 8/1975 |
| EP | 0 148 482 | 7/1985 |
| EP | 0 239 123 | 9/1987 |
| EP | 0 340 740 | 11/1989 |
| EP | 0 687 533 A1 | 12/1995 |
| EP | 1 006 168 A1 | 6/2000 |
| EP | 1 074 243 A2 | 2/2001 |
| EP | 1 225 178 A | 7/2002 |
| WO | WO 90/03357 | 4/1990 |
| WO | WO 01/30873 A1 | 5/2001 |

*Primary Examiner*—Eric Hug
(74) *Attorney, Agent, or Firm*—Arent Fox PLLC

(57) ABSTRACT

Aqueous compositions of (per)fluoropolyether phosphates of formula:

$$T-O-[R_f-CFY-L-O]P(O)(O^-Z^+)(OH); \quad (A)$$

and/or $$(OH)_m(O^-Z^+)_{2-m}P(O)[O-L-YFC-O-R_f-CFY-L-O-P(O)(O^-Z^+)]_{m'}-[O-L-YFC-O-R_f-CFY-L-O]P(O)(O^-Z^+)_{2-m}(OH)_m \quad (B)$$

and use thereof to confer oleo-repellence to the paper by means of the size-press method.

20 Claims, No Drawings

AQUEOUS COMPOSITIONS OF PERFLUOROPOLYETHER PHOSPHATES AND USE THEREOF TO CONFER OLEO-REPELLENCE TO PAPER

The present invention relates to aqueous compositions for the surface treatment (size-press applications) of the already formed paper to confer improved oleo-repellence properties.

More specifically the invention relates to aqueous compositions based on fluorinated components which superficially applied are capable to supply oleo-repellent paper which passes the application tests required by the manufacturers of oleo-repellent packages (grease-proof test) for the food or pet-food industry.

The paper surface oleo-repellence is obtained by means of a size-press system which apply the sizing solution on both sides of the preformed paper.

It is well known that the paper is used for the packaging of fats based on vegetable oils, of products as coffee, chocolate and also for the packaging of foods having a high fat content as meats, chips, hamburgers, popocorns, foods to be cooked in microwave ovens, and pet-food. For these uses it is necessary that the paper be treated with components capable to confer resistance to oils and fats.

The oleo-repellence is commonly evaluated in terms of resistance of the sized paper to the penetration of the oil contained in hydrocarbon drops or hydrocarbon mixtures having a progressively decreasing surface tension, maintained for 15 seconds in contact with the paper specimen (Kit Test, TAPPI 557 method). Usually drops consisting of mixtures of castor oil, toluene and heptane in various ratios are used. The oleo-repellence values obtained by the Kit Test are however an index of the only surface activity of the fluorinated additive and often they have a poor correlation with the real performance in terms of protective barrier to oils and fats, both in normal utilization conditions of the paper packages in which there are prolonged contact times with foods, and in severe utilization conditions due to the temperature (heating of the food packages in microwave ovens) and mechanical stresses due to the bending to obtain the manufactured article. On this ground users utilize a series of tests considered more adherent to practical applications such for example:

Ralston Crease Test (RP-2 test): The resistance properties to the oil penetration in greaseproof papers for pet-food packaging are evaluated. The percentage of the surface of the paper stained by the coloured oil is determined. The specimen acceptability limit threshold is 2% of stained surface.

Resistance test to olive oil: The resistance to olive oil is evaluated at 105° C. for 24 hours. The test is passed when the paper is not stained and it does not show halos (% of stained surface=0).

Resistance test to fat acid mixtures: The resistance to a mixture of palmitic/lauric fat acids ($C_{16}/C_{12}$) is evaluated at 65° C. for 5 minutes. The test is passed when the paper is not stained and it does not show halos.

See the examples for the detailed description of said tests.

Compositions containing fluorinated components to confer oleo-repellence to the paper are known in the prior art, among which phosphates containing perfluoroalkyl groups, polymers containing pendent perfluoroalkanes with respect to the backbone and/or derivatives thereof in the presence of surfactants having a perfluoroalkyl chain described for example in U.S. Pat. No. 5,271,806, can be mentioned. Said commercially used components contain perfluoroalkyl segments which by degradation give rise to perfluorooctyl components to be avoided since they tend to bioaccumulate. See for example patent WO 01/30873.

In U.S. Pat. No. 6,221,434 the use of (per)fluoropolyether phosphoric mono- or diesters for the paper surface sizing to confer oleo-repellence is described. According to the examples said components are used, also in salified form with $NH_4OH$, in an aqueous solution containing isopropyl alcohol in a weight ratio 4:1 and 10:1 with respect to the component. To obtain satisfactory oleo-repellence results, in Kit test terms, amounts of said components such to assure the complete surface covering are used. The used amount must be at least such to form a molecular monolayer on the sized surface. Said component amounts result anti-economic for the paper sector. Tests carried out by the Applicant in the paper sizing using said components in lower amounts than those corresponding to a molecular monolayer, have shown that the so treated paper does not satisfactorily passes the application tests of resistance to the olive oil and to the fat acid mixture.

The need was therefore felt to have available aqueous compositions of components, not comprising flammable solvents, which applied on the paper in amounts lower than those of a molecular monolayer conferred to the paper an oleo-repellence capable to pass the most severe performance tests above mentioned.

The Applicant has unexpectedly and surprisingly found specific aqueous compositions based on (per)fluoropolyether phosphates capable to satisfy the above mentioned requirements.

An object of the present invention are aqueous compositions comprising the following components:

I) a phosphate selected from the following

(A)

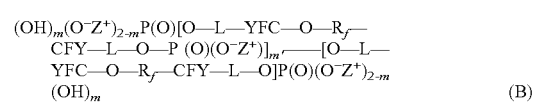

(B)

or mixtures of A) with B)
wherein
m' is an integer from 0 to 20, preferably from 0 to 4;
L is an organic group selected from $-CH_2-(OCH_2CH_2)_n-$, $-CO-NR'-(CH_2)_q-$, with R'=H or $C_1-C_4$ alkyl; n is a number from 0 to 8, preferably from 1 to 3; q is a number from 1 to 8, preferably from 1 to 3;
$Z^+$=alkaline metal ion or a $NR_4$ group with R=H or $C_1-C_4$ alkyl or an aliphatic amine ion;
Y=F, $CF_3$;
m is a number between 0 and 2, extremes included;
$R_f$ is a (per)fluoropolyoxyalkylene chain having a number average molecular weight in the range 350–8,000, preferably 500–3,000, formed by repeating units, statistically distributed along the chain, having at least one of the following structures:
(CFXO), ($CF_2CF_2O$), ($CF_2CF_2CF_2O$), ($CF_2CF_2CF_2CF_2O$), ($CR_4R_5CF_2CF_2O$), ($CF(CF_3)CF_2O$), ($CF_2CF(CF_3)O$),
wherein
X=F, $CF_3$;
$R_4$ and $R_5$, equal to or different from each other, are selected from H, Cl, or perfluoroalkyl from 1 to 4 carbon atoms;
T is a (per)fluoroalkyl group selected from $-CF_3$, $-C_2F_5$, $-C_3F_7$, $-CF_2Cl$, $-C_2F_4Cl$, $-C_3F_6Cl$, optionally substituted with one or two H atoms, preferably one, at the place of F atoms;

optionally

II) a solvent of the glycol class, preferably dipropylen glycol monomethylether or dipropylen glycol or mixtures thereof, wherein the ratio by weight between components I and II is preferably equal to or higher than 2.

The glycols generally have a number of carbon atoms from 2 to 40, preferably from 6 to 20 carbon atoms and are liquid.

When component I) having formula (B) is used, mixtures of components B) wherein m' is different from 0, preferably 1, can be used with components B) wherein m'=0, in a molar ratio in the range 5:95–50:50.

In particular $R_f$ in the (A) and (B) structures can have one of the following structures:

$$—(CF_2O)_{a'}—(CF_2CF_2O)_{b'}— \qquad 1)$$

with a'/b' comprised between 0.5 and 2, extremes included, a' and b' being integers such to give the above mentioned molecular weight;

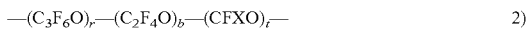

$$—(C_3F_6O)_r—(C_2F_4O)_b—(CFXO)_t— \qquad 2)$$

with r/b=0.5–2.0; (r+b)/t is in the range 10–30, b, r and t being integers such to give the above mentioned molecular weight, X has the above indicated meaning;

$$—(C_3F_6O)_{r'}—(CFXO)_{t'}— \qquad 3)$$

t' can be 0;

when t' is different from 0 then r'/t'=10–30, r' and t' being integers such to give the above mentioned molecular weight; X has the above indicated meaning;

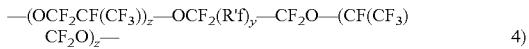

$$—(OCF_2CF(CF_3))_z—OCF_2(R'f)_y—CF_2O—(CF(CF_3)CF_2O)_z— \qquad 4)$$

wherein y is 0 or 1, R'f is a fluoroalkylene group, preferably from 1 to 4 carbon atoms and z is an integer such that the molecular weight be that above mentioned;

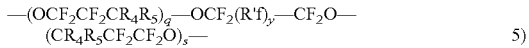

$$—(OCF_2CF_2CR_4R_5)_q—OCF_2(R'f)_y—CF_2O—(CR_4R_5CF_2CF_2O)_s— \qquad 5)$$

wherein:

$R_4$, $R_5$, R'f, y have the above indicated meaning; q and s are integers such that the molecular weight be that above mentioned;

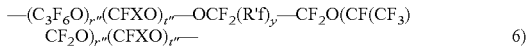

$$—(C_3F_6O)_{r''}—(CFXO)_{t''}—OCF_2(R'f)_y—CF_2O(CF(CF_3)CF_2O)_{r''}—(CFXO)_{t''}— \qquad 6)$$

wherein r''/t''=10–30, r'' and t'' being integers such to give the above mentioned molecular weight; R'f and y having the above indicated meaning.

The monofunctional and bifunctional (per)fluoropolyoxyalkylenes can be prepared starting from the corresponding (per)fluoropolyoxyalkylenes having —COF end groups (see for example the patents GB 1,104,482, U.S. Pat. No. 3,715,378, U.S. Pat. No. 3,242,218, U.S. Pat. No. 4,647,413, EP 148,482, U.S. Pat. No. 4,523,039, EP 340,740, WO 90/03357, U.S. Pat. No. 3,810,874, EP 239,123, U.S. Pat. No. 5,149,842, U.S. Pat. No. 5,258,110).

The invention compositions are prepared by treatment of the phosphates corresponding to component I) in their acid form wherein $Z^+=H^+$, optionally in admixture with a solvent II) in the ratios above mentioned for components I), II), with an aqueous solution of a base until reaching a pH in the range 4–7. When the solvent is present, components I and II are in the mentioned ratios, the complement to 100% by weight is water. Preferably the base is selected from tetramethylammonium hydroxide, triethanolamine and ammonia.

The invention compositions are prepared as aqueous concentrates containing 20–25% by weight of phosphates I). They are subsequently diluted with water at the size-press application time, up to concentrations comprised between 0.1 and 5% by weight, preferably between 0.4 and 1% by weight, of phosphates I). The compositions diluted for the size-press application show an average size of the aggregates of component I) higher than 150 nm, determined by Dynamic Laser Light Scattering (DLLS).

The invention compositions can also be added with various supporting agents usually utilized in the paper industry, such for example amides, as such or functionalized, polyvinyl alcohols, carboxymethylcellulose, components containing aldehydic groups, acrylic resins, styrene-butadiene copolymers.

The preparation of the (per)fluoropolyether phosphates I) can be carried out as follows. The structure (A) monofunctional phosphates can be prepared by reacting the corresponding (per)fluoroalkylenoxides hydroxy-ended with $POCl_3$. To obtain component A) it is necessary to use a molar ratio $POCl_3$/hydroxy-ended component in the range 2/1–10/1, preferably 6/1–8/1. The reaction is carried out by slowly dropping the hydroxy-ended component in POCl3, at a temperature between 50° and 100° C., preferably between 70° and 80° C., by removing the HCl vapours in a KOH trap. The $POCl_3$ excess is removed by distillation while the formed adduct is hydrolyzed by $H_2O$. The obtained component separation takes place by extraction with a suitable organic solvent, such for example ethyl acetate. The structure (A) component is separated from the organic phase according to known techniques, for example by solvent evaporation.

The structure (B) bifunctional (per)fluoropolyether phosphates preparation can be carried out by reacting the corresponding (per)fluoroalkylenoxides di-hydroxy-ended with $POCl_3$. To obtain the derivative with m'=0, it is necessary to use a molar ratio $POCl_3$/di-hydroxy-ended component comprised between 4/1 and 20/1, preferably between 12/1 and 16/1. The reaction is carried out by slowly dropping the hydroxy-ended component in $POCl_3$, at a temperature in the range 50°–100° C., preferably 70°–80° C., by eliminating the HCl vapours in a KOH trap. The $POCl_3$ excess is removed by distillation while the formed adduct is hydrolyzed by $H_2O$. The separation of component (B) with m'=0 takes place by extraction with a suitable organic solvent, such for example ethyl acetate. From the organic phase the component is separated according to known techniques, for example by solvent evaporation.

To obtain the component of structure (B) with m'>0, one proceeds as in the case m'=0 with the difference that after the $POCl_3$ removal, the reaction adduct is further reacted with variable amounts of di-hydroxy-ended component. Subsequently hydrolysis is carried out and the above described procedure is performed.

A further object of the present invention is the use of the invention aqueous compositions, for the paper oleo-repellent repellent surface treatment by application with the size-press method, containing 0.1–5% by weight, preferably 0.4–1% by weight of phosphate of formula A) and/or B) as above defined, optionally containing glycol components.

The following Examples are given for illustrative but not limitative purposes of the invention.

EXAMPLES

Characterization Methods

Aggregate Determonation of Component I)

The Dynamic Laser Light Scattering (DLLS) method described in U.S. Pat. No. 6,197,903, which is here enclosed by reference, has been used.

Oleo-Repellence Evaluation

The oleo-repellence evaluation has been carried out by the following tests:

A) Kit Test (KT)

This test follows the TAPPI 557 method referred to 16 solutions having a different concentration of castor oil, toluene and n-heptane. Said solutions discriminate the various oleo-repellent treatment levels and therefore assign the respective KIT test values essentially in function of the surface tension which ranges from 34.5 dine/cm of the solution 1 to 22 dine/cm of the solution 12, to 20.3 dine/cm of the solution 16. The animal or vegetable fats have surface tensions not lower than 24 dine/cm which corresponds to a Kit test value of about 7.

To the paper sized a kit test value is assigned by means of the following procedure: a paper specimen is placed on a clean flat, black-coloured surface and a drop of the solution 1 is let fall thereon from a height of 25 mm. The drop is left in contact with the paper for 15 sec, removing it then by clean blotting paper and the surface under the drop is examined. If said surface does not appear dark (halo) the test is repeated using a solution having a lower surface tension, until the presence of a dark halo is observed.

The kit test value assigned to the paper is that corresponding to the previous solution which gives rise to the dark halo.

B) Ralston Crease Test (RP-2 test)

The reactants and the instruments necessary for this test are available by Ralston Purina(R) Company. The Ralstone Crease Test allows to evaluate the resistance to the oil penetration in greaseproof papers used in pet-food packaging. The paper specimen to be tested, having 10 cm×10 cm sizes is conditioned for 24 h at 23° C. and 50±2% of relative humidity. Then the specimen is positioned over a glazed paper sheet having the same surface as the specimen, on which a grid of 100 small squares is printed. The whole is placed on a flat, smooth and stiff surface. A metal ring having a diameter of 7.5 cm is put on the paper specimen to be tested. A metal pipe (height=2.5 cm, internal diameter 2.5 cm) is placed in the middle of the specimen, then 5 g of sand (Ottawa sand, 20–30 mesh) are poured into the pipe. The pipe is then removed so as to form a sand cone in the middle of the specimen. Then 1.3 cc of a specific synthetic oil supplied by Ralston Purina which contains 0.1% by weight of a red dye are added to the sand cone by a syringe. Usually for the test at least 4 specimens of the same paper sample are prepared. The specimens with the sand are then placed in a stove at 60° C. and at 50±2% of relative humidity for 24 hours. This time elapsed the specimens with the sand are removed and the surface of the underlying grid stained by the oil is evaluated. The RP-2 test result is expressed as number of stained small squares, which expresses also the percentage of the small squares, which is the average of the results obtained on at least 4 specimens of the same sample. The sample acceptability threshold limit is 2% of the stained surface.

A similar more severe test consists in using a paper sample previously creased along the two diagonals with a suitable roll, having a weight of 2,040±45 g, diameter of 9.5 cm and width of 4.5 cm, covered by a rubber layer having a thickness of 0.6 cm. The roll speed during the creasing must be of 2–3 cm/sec. Also in this case the same above mentioned acceptability limit is valid.

C) Resistance Test to Olive Oil

The edges of a paper specimen having 10 cm×10 cm sizes are creased to prevent the oil from coming out. The specimen is placed over a coated paper on which a grid of 100 small squares is printed, inside a Petri capsule. 5 ml of olive oil are put on the paper, which is transferred in a forced ventilation stove at 105° C. for 24 h. The test is passed when the grid is not stained (% of stained surface equal to 0).

D) Resistance Test to Fat Acid Mixtures

Some drops of a mixture of fat acids present in nature, having the following composition by weight: 20% of palmitic acid ($C_{16}$) and 80% of lauric acid ($C_{12}$), are hot deposited (65° C.) on a sized paper specimen having 10×10 cm sizes. The paper is left in a ventilated stove at 65° C. for 5 minutes. This time elapsed, the oil drops are removed and the paper is visually evaluated as for the method A). The test is considered positive if the presence of halos on the paper is not noticed, either on the side sized or even less on the opposite side.

Paper Characterization

The paper used in the Examples is an Albet 250 model filter paper, having a basis weight of 73 g/m², a thickness of 0.155 mm, apparent density 0.455 g/cc and free from additives of various kind. The specific area measured by the Applicant by BET is about 30 m²/g.

Calculation of the Molecular Monolayer

To evaluate the concentration value of a type B) perfluoropolyether phosphate used in the Examples necessary to obtain a monolayer, applied on the paper by size-press, it has been supposed that a completely stretched out molecule of a perfluoropolyether phosphate (PFPE) has a length of 5 nm and a diameter of 0.3 nm. In the position in which the molecule covers the largest surface, the calculated surface area value is: $As=1.5*10^{-14}$ cm²/molecule. Analyses carried out by the Applicant using the X ray fluorescence technique combined with the quantitative phosphor determination by calibration line, have shown an average content of phosphate PFPE of $5.2*10^{-4}$ $g_{PFPE}/g_{paper}$ when the paper (Albet) was previously sized with a formulation solution diluted at 0.6% by weight of phosphate by size-press. The indicated concentration value corresponds to $N=1.6*10^{17}$ molecules/$g_{paper}$ considering a phosphate number average molecular weight value of 2,000. The estimated area covered by phosphate molecules is: $At=As*N$ or $At=0.24$ m²/$g_{paper}$. This value compared with the surface area experimental datum determined by the BET method for the tested paper (30 m²/g), shows a covering degree clearly lower than the monolayer. Said covering degree results lower than 1% of the available paper surface.

Example 1

An aqueous formulation having pH 4 was prepared, containing 25% by weight of a phosphate mixture formed by 85% by moles of a structure B) phosphate wherein m'=0 and by 25% by moles of a structure B) phosphate wherein m'=1, both having $Z=N(CH_3)_4^+$; $L=$—$CH_2$—$CH_2(OCH_2CH_2)_n$— with n=2; m=1.5; Y=—F; $R_f$ comprising repeating units of type 1) with a'/b'=0.5 and having a number average molecular weight of 1,400, and 1.3% by weight of N(CH$_3$)$_4$OH, 74.7% by weight of water. The formulation was diluted to 0.6% by weight of phosphate with water and showed by DLLS the presence of aggregates having sizes higher than 150 nm. Said diluted formulation was placed on the cylinders of a size-press by which a filter paper sheet was sized by passage through the rolls at a pressure of about 3 bar. Then the paper sheet was dried on a roll heated at the temperature of 100° C. for 3 minutes. The application tests have shown the following oleo-repellent performances:
 A) KT=9
 B) RP-2=0% (0% even with crease)
 C) resistance to olive oil=POSITIVE
 D) resistance to the fat acid mixture C$_{12}$/C$_{16}$=POSITIVE The amount of the phosphate mixture present on the paper is only of 1% with respect to the amount necessary for the calculated monolayer.

Example 2

An aqueous formulation having pH=7 containing 20% by weight of the phosphate mixture of Example 1 was prepared except that in the structure B) components Z=NH$_4^+$ and m=1, and 8.5% by weight of dipropylenglycol monomethylether. The formulation was diluted to 0.6% by weight of phosphate with water and showed by DLLS the presence of aggregates having sizes higher than 150 nm. Said diluted formulation was placed on the cylinders of a size-press by which a filter paper sheet was sized by passage through the rolls at a pressure of about 3 bar. Then it was dried on a roll heated at the temperature of 100° C. for 3 minutes. The application tests have shown the following oleo-repellent performances:
 A) KT=8
 B) RP-2=0% (0% even with crease)
 C) resistance to olive oil=POSITIVE
 D) resistance to the C$_{12}$/C$_{16}$ fat acid mixture=POSITIVE The amount of the phosphate mixture present on the paper is only of 1% with respect to the amount necessary for the calculated monolayer.

Example 3 (Comparative)

An aqueous formulation having pH=7 containing 33% by weight of the phosphate of Example 2 and 30% of isopropanol was prepared.

The formulation was diluted to 0.6% by weight with water and showed by DLLS the presence of aggregates having sizes lower than 150 nm. Said diluted formulation was placed on the cylinders of a size-press by which a filter paper sheet was sized by passage through the rolls at a pressure of about 3 bar. Then it was dried on a roll heated at the temperature of 100° C. for 3 minutes. The application tests have shown the following oleo-repellent performances:
 A) KT=6–7
 B) RP-2=0% (0% even with crease)
 C) resistance to olive oil=POSITIVE
 D) resistance to the C$_{12}$/C$_{16}$ fat acid mixture NEGATIVE Example 4 (Comparative)

An aqueous formulation having pH=2.5 containing 10% by weight of the phosphate mixture of Example 1 was prepared except that Z$^+$=H$^+$. Said formulation was diluted to 0.6% by weight with water and placed on the cylinders of a size-press. A filter paper sheet was sized with the dispersion by passage through the rolls at a pressure of about 3 bar. Then it was dried on a roll heated at the temperature of 100° C. for 3 minutes. The application tests have shown the following oleo-repellent performances:
 A) KT=2
 B) RP-2=100% (100% even with crease)
 C) resistance to olive oil=NEGATIVE
 D) resistance to the C$_{12}$/C$_{16}$ fat acid mixture=NEGATIVE Example 5 (Comparative)

An aqueous formulation having pH=2.5 containing the phosphate mixture of Example 4 and isopropanol (IPA) in a weight ratio 1:1 was prepared. Said formulation was diluted with water until reaching a phosphate content equal to 0.6% by weight and it was placed on the cylinders of a size-press. A filter paper sheet was sized with the dispersion by passage through the rolls at a pressure of about 3 bar. Then it was dried on a roll heated at the temperature of 100° C. for 3 minutes. The application tests have shown the following oleo-repellent performances:
 A) KT=2
 B) RP-2=100% (100% even with crease)
 C) resistance to olive oil=NEGATIVE
 D) resistance to the C$_{12}$/C$_{16}$ fat acid mixture=NEGATIVE Example 6 (Comparative)

An aqueous formulation having pH=10 containing 20% by weight of the phosphate mixture of Example 2 was prepared with the difference that m=0, Z=NH$_4^+$. Said formulation was diluted to 0.6% by weight with water and placed on the cylinders of a size-press. A filter paper sheet was sized with the dispersion by passage through the rolls at a pressure of about 3 bar. Then it was dried on a roll heated at the temperature of 100° C. for 3 minutes. The application tests have shown the following oleo-repellent performances:
 A) KT=7
 B) RP-2=0% (0% even with crease)
 C) resistance to olive oil=NEGATIVE
 D) resistance to the C$_{12}$/C$_{16}$ fat acid mixture=NEGATIVE Example 7 (Comparative)

An aqueous formulation having pH=2.5 containing the phosphate mixture of Example 4 and isopropanol (IPA) in a ratio 1:4 was prepared.

Said formulation was diluted to 0.6% by weight with water and placed on the cylinders of a size-press by which a filter paper sheet was sized by passage through the rolls at a pressure of about 3 bar. Then it was dried on a roll heated at the temperature of 100° C. for 3 minutes. The application tests have shown the following oleo-repellent performances:
 A) KT=5–6
 B) RP-2=0% (0% even with crease)
 C) resistance to olive oil=NEGATIVE
 D) resistance to the C$_{12}$/Cl$_6$ fat acid mixture=NEGATIVE Example 8 (Comparative)

Example 7 was repeated by using a phosphate mixture of Example 4 having pH=10 (complete salification) and isopropanol in a ratio 1:4. The application tests have shown the following oleo-repellent performances:
 A) KT=6–7
 B) RP-2=0% (0% even with crease)

C) resistance to olive oil=POSITIVE (0% of stained surface)
D) resistance to the $C_{12}/Cl_6$ fat acid mixture=NEGATIVE Example 9 (Comparative)

An aqueous dispersion of perfluoroalkyl phosphates Scotchban™ FC807A by 3M, at 0.6% by weight was placed on the cylinders of a size-press. A filter paper sheet was sized with the dispersion by passage through the rolls at a pressure of about 3 bar. Then it was dried on a roll heated at the temperature of 100° C. for 3 minutes. The application tests have shown the following oleo-repellent performances:
A) KT=12
B) RP-2=0% (0% even with crease)
C) resistance to olive oil=POSITIVE (0% of stained surface)
D) resistance to the $C_{12}/C_{16}$ fat acid mixture=NEGATIVE Example 10 (Comparative)

An aqueous dispersion of diethanolamino salts of perfluoroalkylethylphosphates AG™ 530N by Asahi Glass, at 0.6% by weight was placed on the cylinders of a size-press. A filter paper sheet was sized with the dispersion by passage through the rolls at a pressure of about 3 bar. Then it was dried on a roll heated at the temperature of 100° C. for 3 minutes. The application tests have shown the following oleo-repellent performances:
A) KT=16
B) RP-2=0% (0% even with crease)
C) resistance to olive oil=POSITIVE (0% of stained surface)
D) resistance to the $C_{12}/C_{16}$ fat acid mixture=NEGATIVE.

TABLE 1

| Example | Test A) KT | Test B) RP-2 test | Test C) olive oil | Test D) $C_{12}/C_{16}$ fat acid mix |
|---|---|---|---|---|
| 1 | 9 | POSITIVE | POSITIVE | POSITIVE |
| 2 | 8 | POSITIVE | POSITIVE | POSITIVE |
| 3 (comp) | 6–7 | POSITIVE | POSITIVE | NEGATIVE |
| 4 (comp) | 2 | NEGATIVE | NEGATIVE | NEGATIVE |
| 5 (comp) | 2 | NEGATIVE | NEGATIVE | NEGATIVE |
| 6 (comp) | 7 | POSITIVE | NEGATIVE | NEGATIVE |
| 7 (comp) | 5–6 | POSITIVE | NEGATIVE | NEGATIVE |
| 8 (comp) | 6–7 | POSITIVE | POSITIVE | NEGATIVE |
| 9 (comp) | 12 | POSITIVE | POSITIVE | NEGATIVE |
| 10 (comp) | 16 | POSITIVE | POSITIVE | NEGATIVE |

The invention claimed is:
1. Aqueous compositions comprising no flammable solvents and the following components:
I) a phosphate selected from the following

$$T—O—[R_f—CFY—L—O]P(O)(O^-Z^+)(OH) \quad (A)$$

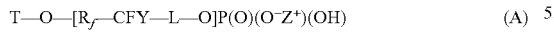
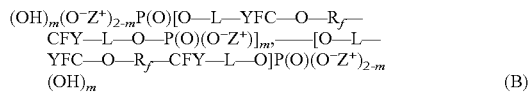

or mixtures of A) and B)
wherein
m' is an integer from 0 to 20 preferably from 0 to 4;
L is an organic group selected from —CH$_2$— (OCH$_2$CH$_2$)$_n$—, —CO—NR'—(CH$_2$)$_q$—, with R'=H or $C_1$–$C_4$ alkyl; n is a number from 0 to 8, q is a number from 1;

$Z^+$=alkaline metal ion or a NR$_4$ group with R=H or $C_1$–$C_4$ alkyl or an aliphatic amine ion;
Y=F, CF$_3$;
m is a number between 0 and 2, extremes included;
R$_f$ is a (per)fluoropolyoxyalkylene chain having a number average molecular weight in the range 350–8,000, formed by repeating units, statistically distributed along the chain, having at least one of the following structures:

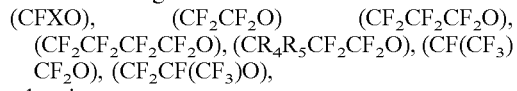
(CF$_2$CF$_2$CF$_2$O), (CR$_4$R$_5$CF$_2$CF$_2$O), (CF(CF$_3$) CF$_2$O), (CF$_2$CF(CF$_3$)O),
wherein
X=F, CF$_3$;
R$_4$ and R$_5$, equal to or different from each other, are selected from H, Cl, or perfluoroalkyl from 1 to 4 carbon atoms;
T is a (per)fluoroalkyl group selected from —CF$_3$, —C$_2$F$_5$, —C$_3$F$_7$, —CF$_2$Cl, —C$_2$F$_4$Cl, —C$_3$F$_6$Cl, optionally substituted with one or two H atoms, at the place of F atoms; optionally
II) a solvent of the glycol class, in which the ratio by weight between components I) and II) is equal to or higher than 2.

2. Compositions according to claim 1, wherein the glycols have a carbon atom number comprised between 2 and 40 atoms and are liquid.

3. Compositions according to claim 1, wherein a mixture of phosphates B) is used, formed respectively by a phosphate B) wherein m' is different from zero, with a phosphate B) wherein m'=0, in a molar ratio in the range 5:95–50:50.

4. Compositions according to claim 1, wherein R$_f$ in the (A) and (B) formulae is selected from the group formed by the following structures:
1) —(CF$_2$O)$_a$—(CF$_2$CF$_2$O)$_b$—with a'/b' comprises between 0.5 and 2, extremes included, a' and b' being integers such to give the above molecular weight;
2) —(C$_3$F$_6$O)$_r$—(C$_2$F$_4$O)$_b$—(CFXO)$_t$—with r/b = 0.5–2.0; (r+b)/t is in the range 10–30, b, r and t being integers such to give the above molecular weight, X has the above meaning;
3) —(C$_3$F$_6$O)$_r$—(CFXO)$_t$—t' can be 0;
when t' is different from 0 then r'/t'=10–30, r' and t' being integers such to give the above molecular weight; X has the above meaning;
4) —(OCF$_2$CF(CF$_3$))$_z$—OCF$_2$(R'f)$_y$—CF$_2$O—(CF(CF$_3$) CF$_2$O)$_z$—wherein y is 0 or 1, R'f is a fluoroalkylene group and z is an integer such that the molecular weight be that above mentioned;
5) —(OCF$_2$CF$_2$CR$_4$R$_5$)$_q$—(OCF$_2$(R'f)$_y$—CF$_z$O— (CR$_4$R$_5$CF$_2$O)$_s$—wherein:
R$_4$, R$_5$, R'f, y have the above meaning;
q and s are integers such that the molecular weight be that above mentioned;
6) —(C$_3$F$_6$O)$_{r''}$(CFXO)$_{t''}$—OCF$_2$(R'f)$_y$—CF$_2$O (CF(CF$_3$) CF$_2$O)$_{r''}$(CFXO)$_{t''}$—wherein r''/t''=10–30, r'' and t'' being integers such to give the above molecular weight; R'f and y having the above meaning.

5. Aqueous compositions according to claim 1, containing 0.1–5% by weight of phosphates I) and containing aggregates of I) wherein the average size of the aggregates is higher than 150 nm, determined by Dynamic Laser Light Scattering (DLLS).

6. The aqueous compositions of claim 1 wherein n is a number from 1 to 3.

7. The aqueous compositions of claim 1 wherein q is a number from 1 to 3.

8. The aqueous compositions of claim 1 wherein $R_f$ is a (per)fluoropolyoxyalkylene chain having a number average molecular weight in the range 500–3,000.

9. The aqueous compositions of claim 1 wherein the —$CF_2Cl$, —$C_2F_4Cl$, or —$C_3F_6Cl$, is substituted with one H atom.

10. The aqueous compositions of claim 1 wherein the solvent of the glycol class is dipropylen glycol monomethylether or dipropylen glycol or mixtures thereof.

11. The aqueous compositions of claim 2, wherein the glycols have a carbon atom number comprised from 6 to 20 atoms.

12. The aqueous compositions of claim 4 wherein $R'_f$ is a fluoroalkylene group with from 1 to 4 carbon atoms.

13. The aqueous compositions of claim 5 containing 0.4–1% by weight of phosphates.

14. A method for oleo-repellent surface treatment of paper by size-press consisting essentially of applying by means of a size-press system aqueous compositions comprising of the following components:

I) a phosphate selected from the following

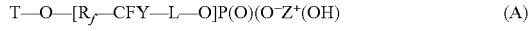

T—O—[$R_f$—CFY—L—O]P(O)(O⁻Z⁺(OH)     (A)

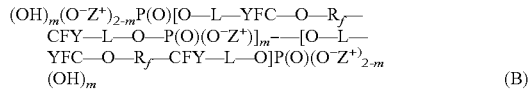

$(OH)_m(O^-Z^+)_{2-m}P(O)[O—L—YFC—O—R_f—CFY—L—O—P(O)(O^-Z^+)]_{m'}—[O—L—YFC—O—R_f—CFY—L—O]P(O)(O^-Z^+)_{2-m}(OH)_m$     (B)

or mixtures of A) and B) wherein
m' is an integer from 0 to 20;
L is an organic group selected from —$CH_2$— ($OCH_2CH_2)_n$—, —CO—NR'—($CH_2)_q$—, with R'=H or $C_1$–$C_4$ alkyl; n is a number from 0 to 8; q is a number from 1 to 8;
$Z^+$=alkaline metal ion or a $NR_4$ group with R=H or $C_1$–$C_4$ alkyl or an aliphatic amine ion;
Y=F, $CF_3$;
m is a number between 0 and 2, extremes included;
$R_f$ is a (per)fluoropolyoxyalkylene chain having a number average molecular weight in the range 350–8,000, formed by repeating units, statistically distributed along the chain, having at least one of the following structures:

(CFXO), ($CF_2CF_2O$) ($CF_2CF_2CF_2O$), ($CF_2CF_2CF_2CF_2O$), ($CR_4R_5CF_2CF_2O$), ($CF(CF_3)CF_2O$), ($CF_2CF(CF_3)O$), wherein
X=F, $CF_3$;
$R_4$ and $R_5$, equal to or different from each other, are selected from H, Cl, or perfluoroalkyl from 1 to 4 carbon atoms;
T is a (per)fluoroalkyl group selected from the group consisting of —$CF_3$, —$C_2F_5$, —$C_3F_7$, —$CF_2Cl$, —$C_2F_4Cl$, and —$C_3F_6Cl$, optionally substituted with one or two H atoms at the place of F atoms; and optionally II) a solvent of the glycol class, in which the ratio by weight between components I) and II) is equal to or higher than 2.

15. The method for oleo-repellent surface treatment of paper by size-press according to claim 14, wherein m' is an integer from 0 to 4.

16. The method for oleo-repellent surface treatment of paper by size-press according to claim 14, wherein n is a number from 1 to 3.

17. The method for oleo-repellent surface treatment of paper by size-press according to claim 14, wherein q is a number from 1 to 3.

18. The method for oleo-repellent surface treatment of paper by size-press according to claim 14, wherein $R_f$ is a (per)fluoropolyoxyalkylene chain having a number average molecular weight in the range 500–3,000.

19. The method for oleo-repellent surface treatment of paper by size-press according to claim 14, wherein T is a (per)fluoroalkyl group selected from the group consisting of —$CF_3$, —$C_2F_5$, —$C_3F_7$, —$CF_2Cl$, —$C_2F_4Cl$, and —$C_3F_6Cl$, optionally substituted with one H atom at the place of an F atom.

20. The method for oleo-repellent surface treatment of paper by size-press according to claim 14, wherein said solvent of the glycol class is dipropylen glycol monomethylether or dipropylen glycol or mixtures thereof.

* * * * *